(12) United States Patent
Sharma et al.

(10) Patent No.: US 7,981,253 B2
(45) Date of Patent: Jul. 19, 2011

(54) DISTILLATION TOWER BAFFLE

(75) Inventors: Arun K. Sharma, Alexandria, VA (US); Theodore Sideropoulos, Oakton, VA (US); Rutton D. Patel, Arlington, VA (US); Brian D. Albert, Fairfax, VA (US); Alvin U. Chen, Fairfax, VA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 1142 days.

(21) Appl. No.: 11/698,099

(22) Filed: Jan. 26, 2007

(65) Prior Publication Data
US 2007/0175746 A1 Aug. 2, 2007

Related U.S. Application Data

(60) Provisional application No. 60/763,925, filed on Feb. 1, 2006.

(51) Int. Cl.
*B01D 3/06* (2006.01)
*B01D 3/10* (2006.01)
*B01D 45/08* (2006.01)

(52) U.S. Cl. ............ 202/158; 96/189; 96/214; 96/220; 159/2.1; 159/43.1; 159/DIG. 16; 202/153; 202/197; 202/205; 202/262; 203/40; 203/88; 203/91; 208/352; 208/357; 208/361; 208/366; 196/114; 196/125; 196/127; 196/135

(58) Field of Classification Search .............. 159/2.1, 159/43.1, DIG. 16; 196/114, 125–127, 135; 202/153, 158, 197, 205, 262; 96/189, 214, 96/220; 203/40, 88, 91; 208/352, 357, 361, 366
See application file for complete search history.

(56) References Cited

U.S. PATENT DOCUMENTS

| 2,327,534 A | * | 8/1943 | Lambert | 208/352 |
| 3,296,774 A | | 1/1967 | Hoogendoorn | |
| 3,492,795 A | * | 2/1970 | Guerrieri | 55/463 |
| 3,817,501 A | | 6/1974 | Tjutjunnikov et al. | |

(Continued)

FOREIGN PATENT DOCUMENTS

CH 332 796 A 9/1958

(Continued)

OTHER PUBLICATIONS

PCT International Search Report.

*Primary Examiner* — Virginia Manoharan
(74) *Attorney, Agent, or Firm* — Glenn T. Barrett; Malcolm D. Keen (57) ABSTRACT

An improved de-entrainment device for use in distillation towers, especially vacuum distillation towers used for fractionating petroleum atmospheric resids is in the form of a baffle which is to be located in the portion of the tower below the feed zone and at the top of the flash zone. The baffle is in the form of an apertured plate above the stripping zone and in its preferred form comprises number of radial fins or blades, resembling a static fan with openings between the fins to permit vapors from the lower portions of the tower to pass upwards through the baffle with a minimal pressure drop. The fins of the baffle are preferably oriented at an angle between 30° and 60° away from the incoming feed so that the incoming feed stream skims over the top edges of the fins.

21 Claims, 8 Drawing Sheets

U.S. PATENT DOCUMENTS

| | | | |
|---|---|---|---|
| 4,278,495 A * | 7/1981 | Regehr | 159/27.2 |
| 4,414,100 A * | 11/1983 | Krug et al. | 208/153 |
| 4,629,481 A | 12/1986 | Echols | |
| 4,664,784 A * | 5/1987 | Harandi | 208/354 |
| 4,698,138 A | 10/1987 | Silvey | |
| 4,714,542 A * | 12/1987 | Lockett, Jr. | 208/347 |
| 4,770,747 A * | 9/1988 | Muller | 202/176 |
| 5,972,171 A | 10/1999 | Ross et al. | |
| 2004/0130041 A1 * | 7/2004 | Resetarits et al. | 261/79.2 |
| 2005/0146062 A1 * | 7/2005 | Laird et al. | 261/79.2 |

FOREIGN PATENT DOCUMENTS

| | | |
|---|---|---|
| DE | 27 25 119 B1 | 10/1978 |
| DE | 29 21 449 A1 | 12/1979 |
| WO | WO 02074404 A1 | 9/2002 |

* cited by examiner

DISTILLATION TOWER BAFFLE

CROSS REFERENCE TO RELATED APPLICATION

This application relates and claims priority to U.S. Provisional Patent Application Ser. No. 60/763,925, entitled "Distillation Tower Baffle" filed on Feb. 1, 2006, the disclosure of which is hereby incorporated specifically herein in its entirety.

FIELD OF THE INVENTION

This invention relates to a baffle for use in a distillation tower used for separating liquids into fractions of different boiling points. It is particularly applicable to vacuum distillation towers used for the fractionation of petroleum liquids but it may also be used in towers and units of other types where re-entrainment of a component separated from the incoming feed liquid presents problems, typically in atmospheric towers and fractionators in other applications.

BACKGROUND OF THE INVENTION

Separation units, such as atmospheric distillation units, vacuum distillation units and product strippers, are major processing units in a petroleum refinery or petrochemical plant. Atmospheric and vacuum distillation units are used to separate crude oil into fractions according to boiling point for downstream processing units which require feedstocks that meet particular specifications. In the initial fractionation of crude oil, higher efficiencies and lower costs are achieved if the crude oil separation is accomplished in two steps: first, the total crude oil is fractionated at essentially atmospheric pressure, and second, a bottoms stream of high boiling hydrocarbons (the atmospheric resid) is fed from the atmospheric distillation unit to a second distillation unit operating at a pressure below atmospheric, referred to as a vacuum distillation tower. The reduced pressure in the vacuum tower allows the unit to separate the bottoms fraction from the atmospheric tower into fractions at lower temperature to avoid thermally-induced cracking of the feed.

The vacuum distillation unit typically separates the bottoms stream coming from the atmospheric unit into various gas oil streams which may be categorized according to the needs of the refiner as light vacuum gas oil, heavy vacuum gas oil or vacuum distillate. The undistillable residual or bottoms fraction leaves the vacuum distillation unit as a liquid bottoms stream. Additional information concerning the use of distillation in petroleum refining is to be found in Petroleum Refining Technology and Economics, Gary, J. H. and Handwerk, G. E., pp. 31-51, Marcel Dekker, Inc. (1975), ISBN 0-8247-7150-8 as well as Modern Petroleum Technology, 4$^{th}$ Ed., Hobson, Applied Science Publishers, 1973, ISBN 0-8533-4487-6 and numerous other works.

In atmospheric or vacuum distillation, lighter hydrocarbons are vaporized and separated from relatively heavier hydrocarbons. Although the heavier hydrocarbons may not vaporize, they may be carried into the lighter hydrocarbons because of entrainment. This is particularly the case within many commercial designs of vacuum towers in which the two phase feed stream to the tower is generally under turbulent conditions so that the separated resid droplets are easily entrained in the vapors that are being flashed off from the incoming feed stream. Entrainment is undesirable because first, the presence of high boiling or undistillable fractions may be undesired for their physical properties, e.g. viscosity, and second, because the entrained heavier hydrocarbons are typically contaminated with metal-containing compounds such as vanadium or nickel compounds, that can poison the catalysts used in downstream processing. While some metal contaminants enter the lighter fractions by vaporization, reduction of entrainment is a more effective method of reducing metals contamination as it is the heavier fractions in which these contaminants are concentrated. For this reason, the present invention may be applied to fractionation or distillation towers regardless of the operating pressure if the construction of the towers or their operating regimes have led to re-entrainment problems; it may be applied to atmospheric towers, vacuum towers and high pressure towers or any unit in which reduction of re-entrainment is desirable.

Distillation towers often use various tangential entry devices to impart centrifugal force to the two-phase feed entering the tower. The droplets not captured in the feed zone are entrained with ascending vapors from the flash zone immediately underneath the feed zone and pass to the wash zone above the feed zone. If stripper trays are positioned at the bottom of the flash zone, the swirling feed vortex will tend to entrain resid from the top stripper tray and increase the extent of liquid entrainment, depending in part, by the shear force of the feed vapors on the liquid/froth surface of the liquid pool on the tray.

Various steps have previously been used or proposed to reduce entrainment in vacuum distillation. Demisters or wire mesh pads may be installed at some point between the flash zone and a liquid draw-off point. Demister or wire mesh pads may not, however, be completely satisfactory because they may have a tendency to plug with heavy oil and other material, have a tendency to corrode, with holes resulting from the corrosion or simply be ineffective in reducing entrainment.

Methods other than demister pads have also met with only limited success in many applications. Conventional bubble-cap trays above the flash zone may cause the vapor to pass through liquid on the bubble-cap tray, thereby allowing vapor to re-entrain liquid droplets besides creating a pressure drop which may be excessive, particularly in a vacuum tower in which the total tower pressure drop (top to bottom) should be maintained as low as is feasible.

Chimney trays having a number of risers attached to a plate having holes, with a baffle attached to the top of each riser have also been used. Chimney trays are available that use two direction changes in the flow of the vapor/liquid to improve liquid/vapor separation have a lower pressure drop than bubble-caps but they may still not be completely effective in reducing entrainment.

U.S. Pat. Nos. 4,698,138 (Silvey) and 5,972,171 (Ross) describe de-entrainment trays for vacuum towers which are based upon risers to effect improved liquid/vapor separation. Another type of de-entrainment device which has been used in various applications has taken the form of a conical baffle with vertical sides which sits over a large diameter riser located at the top of the stripper section of the vacuum tower. While this device has been effective it is relatively large and may not be suitable for installation in existing units which do not have adequate vertical clearances.

A further problem may be encountered in vacuum towers used for petroleum distillation. The bottoms stream from the atmospheric tower is passed into the flash zone of the vacuum tower where a portion of the stream is vaporized and travels up into the rectification or wash section in the upper portion of the tower. The liquid (non-vaporized) portion of the feed falls onto the trays in the stripper zone in the lower portion of the tower and may be agitated into a froth by the ascending vapor stream from the lower stripper zone as well as by the turbulent incoming feed stream; the liquid elements of the froth may then be picked up and entrained by the ascending vapors and taken up with the lighter fractions into the upper portion of the tower.

A need therefore exists to devise an improved device to reduce the degree of re-entrainment of separated liquids into the vapor stream of a distillation tower or column, particularly in vacuum and atmospheric distillation columns between the flash zone and the stripper zone. The improved device should, at the same time, cause a minimal pressure drop appropriate to use in vacuum distillation units.

SUMMARY OF THE INVENTION

The present invention provides an improved device for distillation towers or columns which effectively reduces the extent to which separated liquids are re-entrained into the vapor streams in the columns. The device is particularly suitable for use in towers which have a feed inlet located above a zone which contains liquid separated from the feed and whose entrainment is to be reduced to the extent feasible. The device is especially adapted to use in vacuum distillation towers used for fractionating petroleum atmospheric resids. In this application, it has the capability of reducing the entrainment of the liquid resid fraction into the vapor stream while, at the same time, occupying a smaller volume of the tower as compared to known types of de-entrainment device. Its simplicity of construction also makes it economical to build and install as well as providing the potential for trouble-free operation. It may be applied to towers or columns regardless of the type of feed device and so may be applied both with tangential and radial feed devices although in its preferred form described below, it is of special utility with tangential feed inlets.

According to the present invention, the distillation tower has a lower stripping zone, upper rectification zone, and a flash zone between the stripping zone and the rectification zone. An inlet for the feed to be distilled is located between the stripping zone and the rectification zone, usually within and towards the top of the flash zone. An inlet for a stripping medium, usually steam, is located in the lower part of the stripping zone so that the stripping medium passes up through the stripping zone to remove the more volatile components from the high boiling residual material which enters the stripping zone from the flash zone above it. In order to reduce the degree of re-entrainment of residual material from the stripping zone into the vapor stream ascending through the flash zone into the rectification zone, a re-entrainment reduction device is provided at the top of the stripping zone in the form of a baffle which allows the upward passage of vapor from the stripping zone but inhibits the downward flow of vapor from the flash zone into the stripping zone. This baffle may be in the form of a simple apertured plate or it may be in the form of a fabricated baffle with passages for upward vapor flow defined by upwardly directed vapor flow passages, for example, in the form of an "egg crate" baffle.

In its most preferred form, the re-entrainment reduction device takes the form of a radially-louvered baffle which is located in the portion of the tower below the feed zone. The baffle is in the form of a number of radial fins or blades, resembling a static fan with openings between the fins to permit vapors from the stripping zone in the lower portion of the tower to pass upwards through the baffle with a minimal pressure drop. The fins of the baffle are preferably oriented so that the incoming feed stream skims over the top surfaces or edges of the fins but they may be oriented at any angle with respect to the plane of the baffle, as described below.

It is an aspect of the present invention to provide a de-entrainment baffle for location in a distillation tower having a feed zone, a flash zone and a wash zone. The baffle includes a plurality of radial fins with openings between the fins to permit the upward passage of vapors from the portion of the tower below the baffle. Each fin is angularly inclined with respect to a plane passing through a central axis of the baffle such that an upper edge of the fin is displaced relative to the lower edge in the direction of flow of incoming feed to the tower. Preferably, each fin is angularly inclined with respect to the plane passing through the central axis of the baffle such that the upper edge of the fin is displaced relative to the lower edge in the direction of flow of incoming feed to the tower by an angle from 0° to 180°. More preferably, the angle is between 30° to 60° and the inclination of each fin relative to the central axis of the baffle is constant along the radial length of the fin.

The baffle includes a central circular hub and a peripheral collar spaced from the central circular hub. The plurality of radial fins extend between the central hub and the peripheral collar. The central hub comprises an open collar providing a liquid downcomer for passage of liquid downwards through the baffle. The central hub includes an upstanding circular wall member and a cover over the top of the wall member. The baffle may further include at least one intermediate collar spaced between the central circular hub and the peripheral collar. A first set of fins extends between the central circular hub and one intermediate collar and a second set of fins extends between the intermediate collar and the peripheral collar.

Each de-entrainment baffle has at least one liquid downcomer to permit downward passage of liquid past the baffle. The downcomer may be located in a central portion of the baffle. Alternatively, the downcomer may be offset from the center of the baffle. It is also contemplated that multiple downcomers may be provided. The downcomers may extend parallel to each other. The downcomers may extend at an angle with respect to each other.

BRIEF DESCRIPTION OF THE DRAWINGS

The invention will now be described in connection with the following drawings in which like reference numerals designate like elements and wherein.

DETAILED DESCRIPTION

Figure 1:
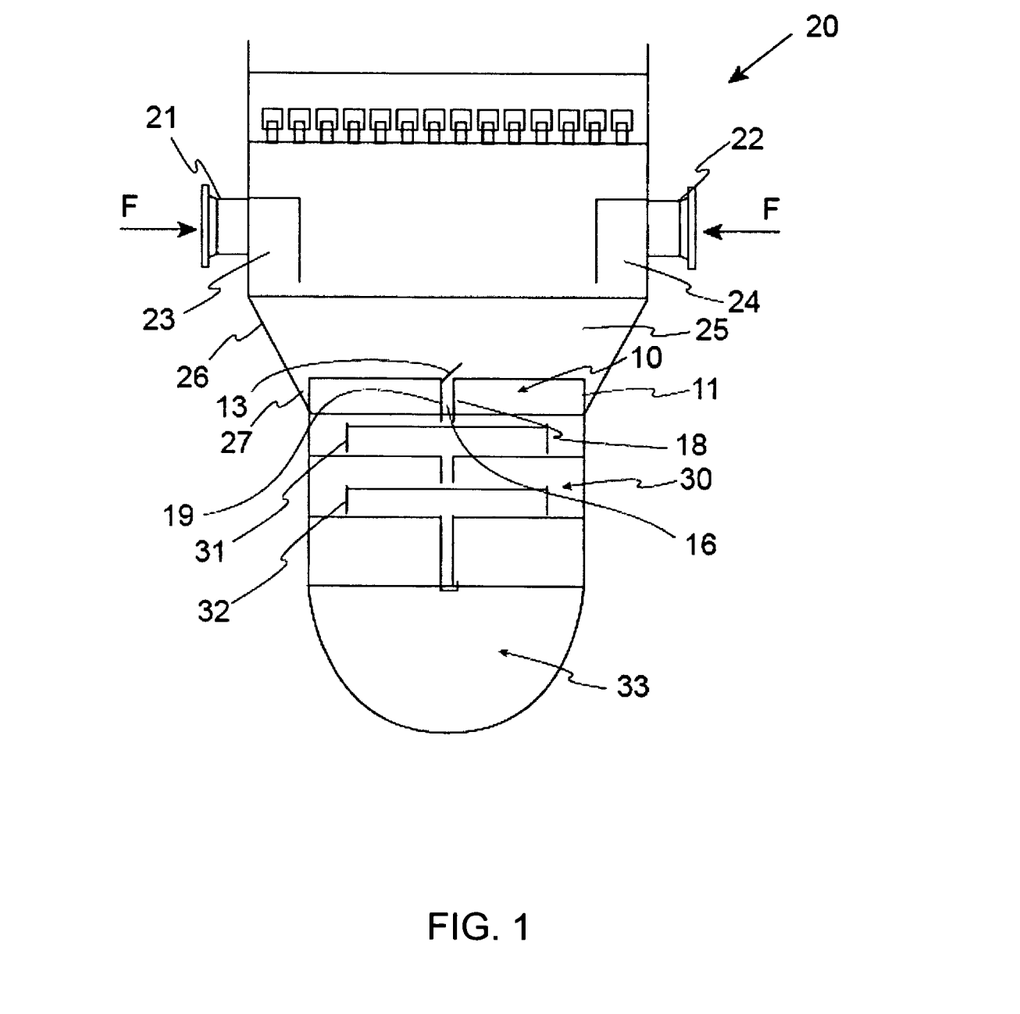
FIG. 1 is a simplified cross sectional view of vacuum tower illustrating the location of the radial louver baffle in the vacuum tower.
Figure 2:
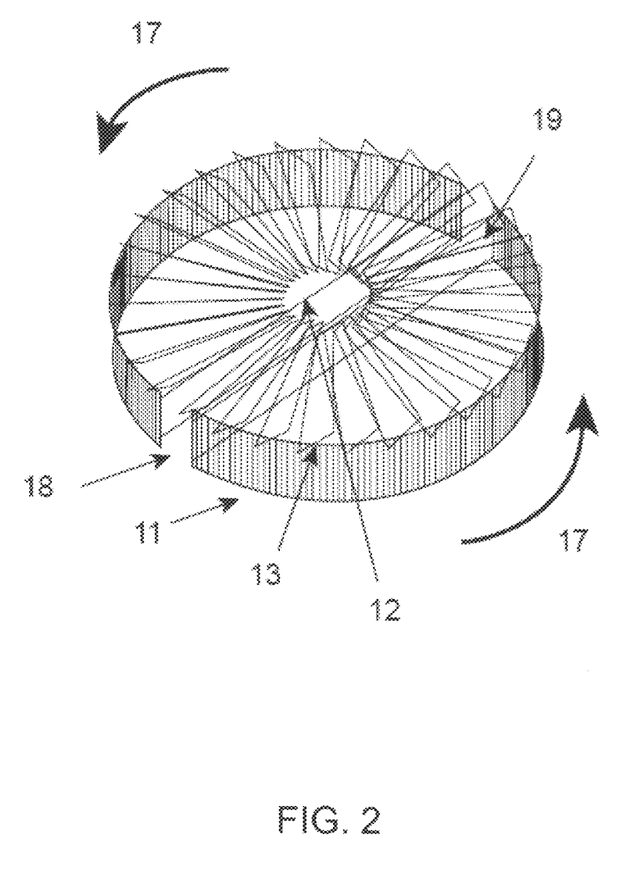
FIG. 2 is an isometric schematic of a radial louver baffle according to an embodiment of the present invention.

The present invention will now be described in greater detail in connection with the figures. FIG. 1 shows the location of a baffle 10 in a vacuum tower 20, with only the lower portion of the tower illustrated for simplicity. The feed F enters tower 20 through two radial inlets 21, 22 which feed into tangential inlet horns 23, 24 in the form of inverted channels which direct the feed in a downward direction into flash zone 25 where vaporization commences in the flow of heated, ascending vapors from below. While two inlets are shown, the present invention is not intended to be so limited. It is contemplated that a single inlet or multiple inlets may be provided. The configuration of the inlet horns 23, 24 confers a rotating vector of motion to the incoming feed so that its path can be considered as a downward helix. The feed enters the feed/flash zone of the tower with a rotating vector of motion imparted by the feed inlet system, the direction of flow of the entering feed (with respect to the tower axis) being indicated by arrows 17, shown in FIG. 2. Various alternative inlet horn configurations are known and may be used, for example, the configurations shown in U.S. Pat. No. 4,770,747 and U.S. Pat. No. 4,315,815. The feed maintains its characteristic rotating flow pattern within the feed and flash zone of the tower and mixes with the ascending vapor stream in flash zone 25. Liquid droplets from the feed are spun outwards by the rotating motion within these zones and collect on walls 26 in the flash zone. The liquid droplets then coalesce and pass downwards to a circular channel 27 formed between the sloping walls 26 of the flash zone 25 and an outer peripheral collar 11 of baffle 10 located on the top of the stripper zone 30. The liquid then passes down through downcomer 16, as shown in FIG. 2, formed by a gap or gaps in the outer collar of the baffle 10 onto the top stripper tray 31 in the stripping zone and then onto the next tray 32 and successively to any additional stripper trays. An inlet for the steam stripping medium is provided in the reboil section 33 at the bottom of the tower. Alternative pathways for the liquid into the stripper zone 30 may be provided, for example, by conduits formed externally of the tower 20 or by having a higher peripheral collar to the baffle with a number of ports below the level of the fins through which the liquid may pass from channel 27 to the stripper zone 30. Vapors coming up from the region below the baffle join with the vapors flashed from the incoming feed and move into the rectification zone of the tower.

As noted above, baffle 10 may be in the form of a simple apertured plate. The total cross-sectional area of the apertures should be sufficient to allow the upward passage of the vapors from the stripping zone, comprising the stripping medium and the stripped vapors from the feed. The plate may be planar or non-planar, for example, in the form of an apertured wide cone. The upward flow of the vapors from the stripping zone tends to prevent the rotating mass of fluid in the flash zone from passing down through the apertures into the stripping zone and so serves to reduce the extent to which the liquid on the top stripper tray is re-entrained in the rotating mass of vapor/liquid in the flash zone. In order to promote desirable flow patterns in the two-phase fluids in the flash zone, flow vanes may be provided on the baffle for the vapors passing through the apertures. These flow vanes may be provided in the manner of a jet tray simply by punching U-shaped cuts in the baffle and bending the metal tabs upwards to form flow vanes with longitudinal slots to permit the vapor flow. The flow vanes may be directed in the same or different directions, for example, all the same way or in two opposing directions. Another possibility is to form the flow vanes in groups, e.g. in repetitive squares with the vanes directed to provide a desirable flow pattern in the flash zone.

Alternatively, the slots may be configured as radial slots extending from the central area of the plate out towards the circumference. Again, the total area of the apertures will be sufficient to allow upward vapor flow from the stripper zone; the unperforated areas between the radial slots will serve to inhibit downward flow of vapor onto the top stripper tray. In this form, the baffle is similar to the preferred Radial Louver Baffle described below.

Another form of baffle is an "egg crate" type baffle composed of two groups of elongated strips or flat plates which intersect with one another to form a series of upwardly directed flow passages for the vapors from the stripping zone. The plates may be secured to a surrounding collar to fix them in place and hold them at the correct angle relative to the plane of the baffle. The intersecting plates readily allow the upward flow of vapors from the stripping zone while protecting the liquid on the top stripper tray from being caught up and entrained by the rotating mass of vapor/liquid in the flash zone.

While these baffles are suitable for the reduction of re-entrainment, a preferred construction will now be described in connection with the figures. The basic structural elements of a baffle 10 in accordance with an embodiment of the present invention, referred to as a Radial Louver Baffle, are shown in FIG. 2. The complete baffle 10 resembles a fan, albeit one which does not rotate. It comprises a peripheral collar 11 which is sized to fit the interior of the tower 20 in which the baffle 10 is to be used. A central, inner collar 12 forms a central hub. A number of radial fins 13, similar to the blades of a fan, extend between central collar 12 and the outer peripheral collar 11. A single fin 13 is illustrated in FIG. 1. Each of the fins 13 has a similar construction. Each fin 13 has a generally planar construction, as shown in FIGS. 2-5. The present invention, however, is not intended to be limited to a planar construction; rather, it is contemplated that other configurations including the corrugated construction shown in FIG. 6 are contemplated and considered to be well within the scope of the present invention. The corrugations or bends in fin 113 increase the stability of the fins and may serve to enhance the collection of the entrained component. The fins 13 or 113 extend outwardly from the inner collar 12. It is preferable that the uppermost portion of the fins are located below the top edge of the collar 12, but the above the uppermost edge of the peripheral collar 11.

As shown in FIG. 2, a pair of parallel plates 18, 19 extend across the baffle 10 from one side to the other below the level of fins 13 and central collar 12 to form a centrally located, radial liquid downcomer 16 with radially opposed liquid inlets at each end to allow liquid to flow from the circular channel 27 in flash zone 25 to the stripper tray 31 under the baffle 10. The peripheral collar 11 is interrupted in the regions where it meets plates 18, 19 to allow the entry of liquid there through from channel 27. The central collar, 12, may be left open, as shown in FIGS. 2-6 to provide an additional path for vapor to pass upwards from the region below the baffle or, alternatively, it may be sealed by a circular plate if the open area of the baffle is otherwise adequate for the required vapor flow capacity.

Figure 7:
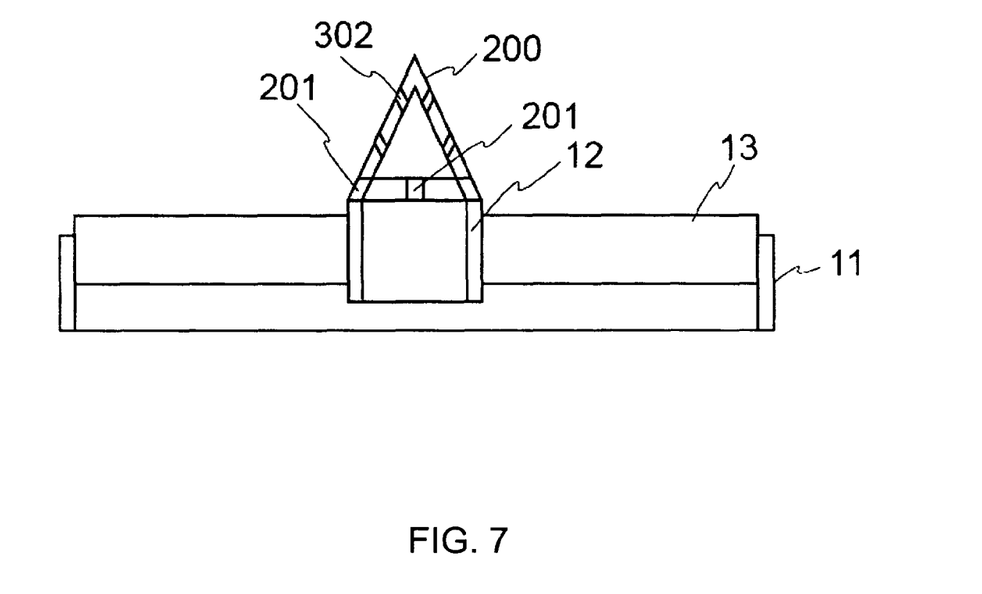
FIG. 7 is a simplified cross sectional view of a radial louver baffle in accordance with the present invention having a conical cap covering an opening in the central collar.
Figure 8:
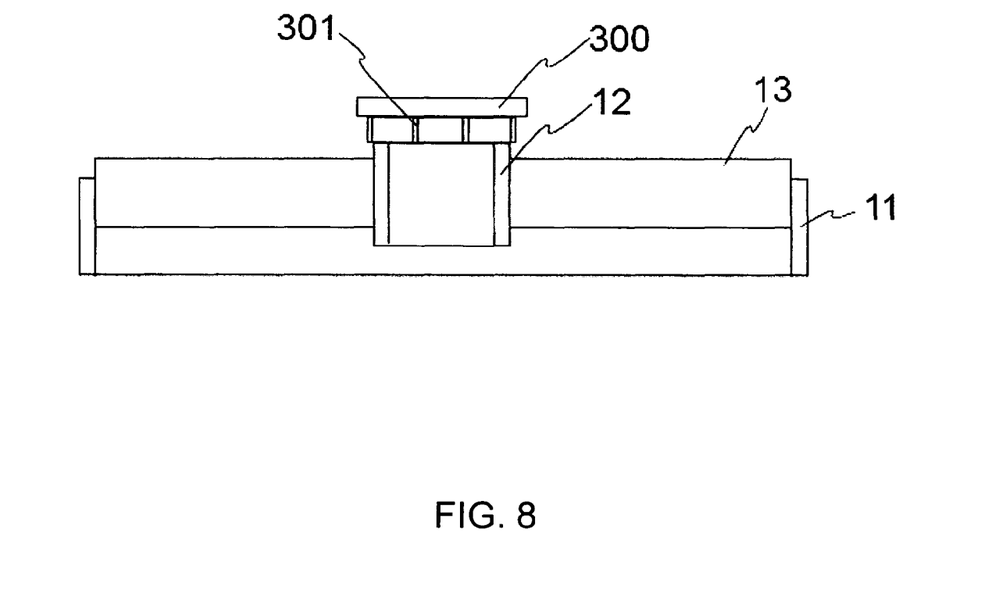
FIG. 8 is a simplified cross sectional view of a variation of the radial louver baffle of FIG. 7 having a plate covering an opening in the central collar.

If the central collar 12 is left open for vapor flow, it may be covered with a plate or cap having openings or slots formed therein, which permits the flow of vapor there through and prevents any liquid droplets, e.g. in the form of spray, from passing down into the stripper zone. The cover may be provided by a flat, circular plate 300, as shown in FIG. 8 that is supported by the top edge of the collar 12 by rods or struts 301, which allow a path for vapor flow between the top edge of the collar 12 and the cover 300. The plate 300 may include openings therein to permit the passage of vapor therethrough. The cover may be provided by a domed or conical cap or hat 200 supported above the top edge of collar 12 by rods or flat struts 201 which allow a path for vapor flow between the top edge of the collar and the lower peripheral edge of the cover, as shown in FIG. 7. The cover or hat may have slots or openings 302 formed therein to permit the passage of additional vapor therethrough.

Figure 3:
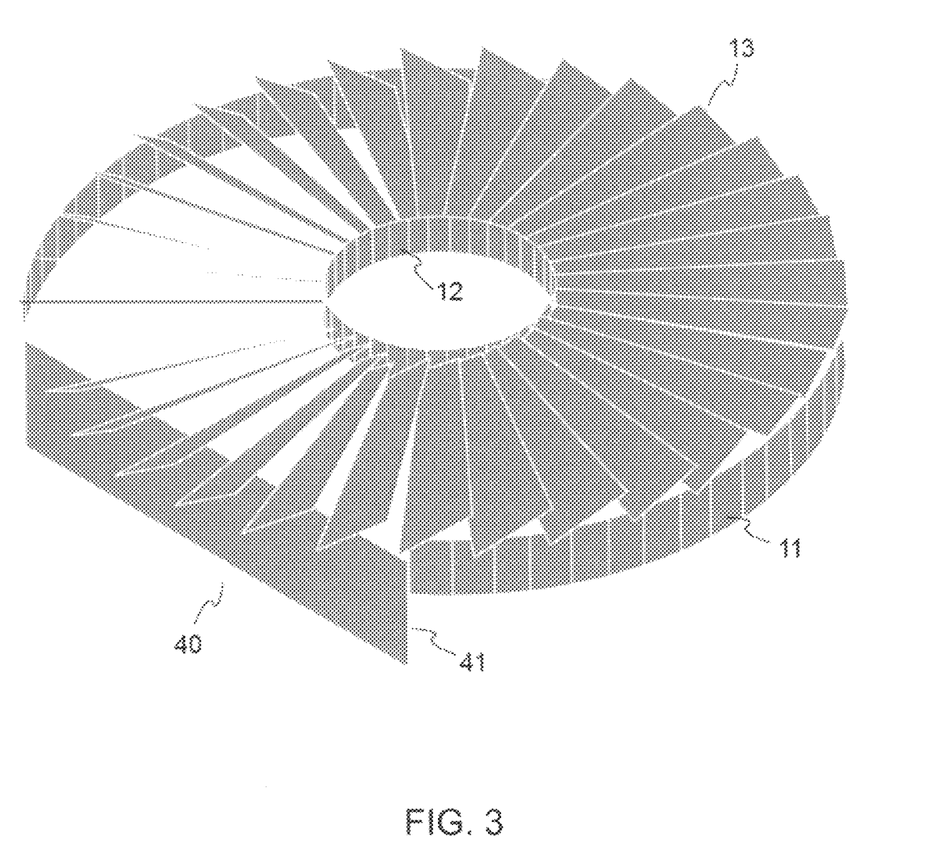
FIG. 3 is an isometric schematic of a radial louver baffle with a modified liquid downcomer in accordance with another embodiment of the present invention.
Figure 4:
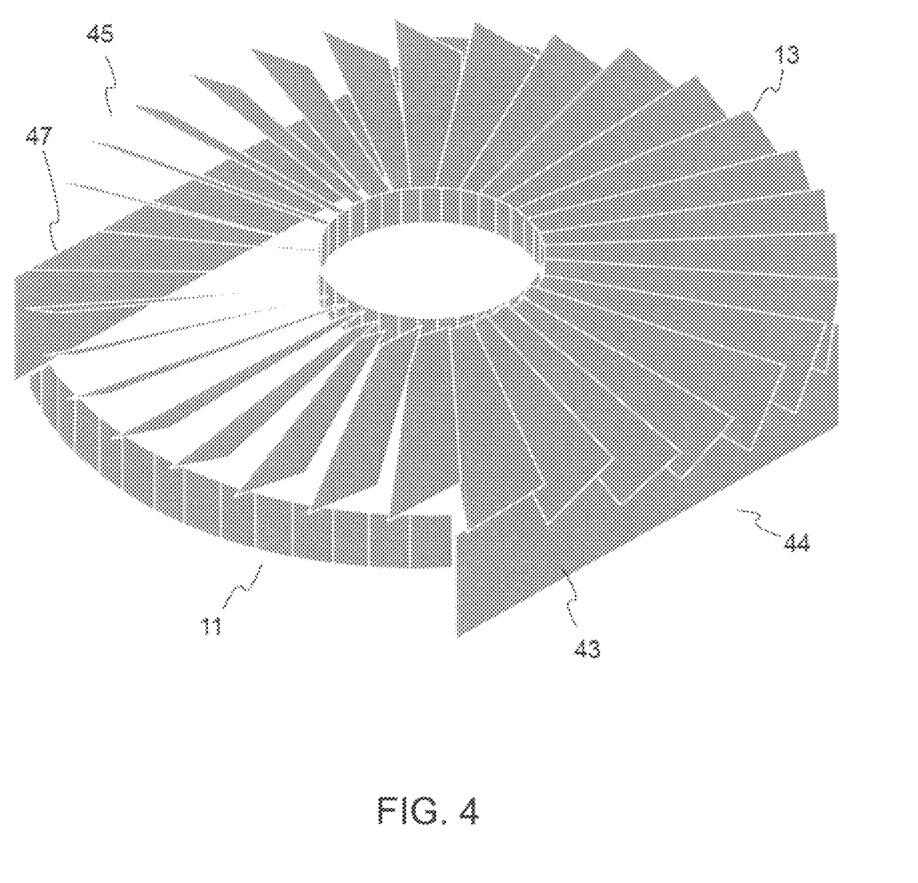
FIG. 4 is an isometric schematic of a radial louver baffle with a modified liquid downcomer in accordance with yet another embodiment of the present invention.
Figure 5:
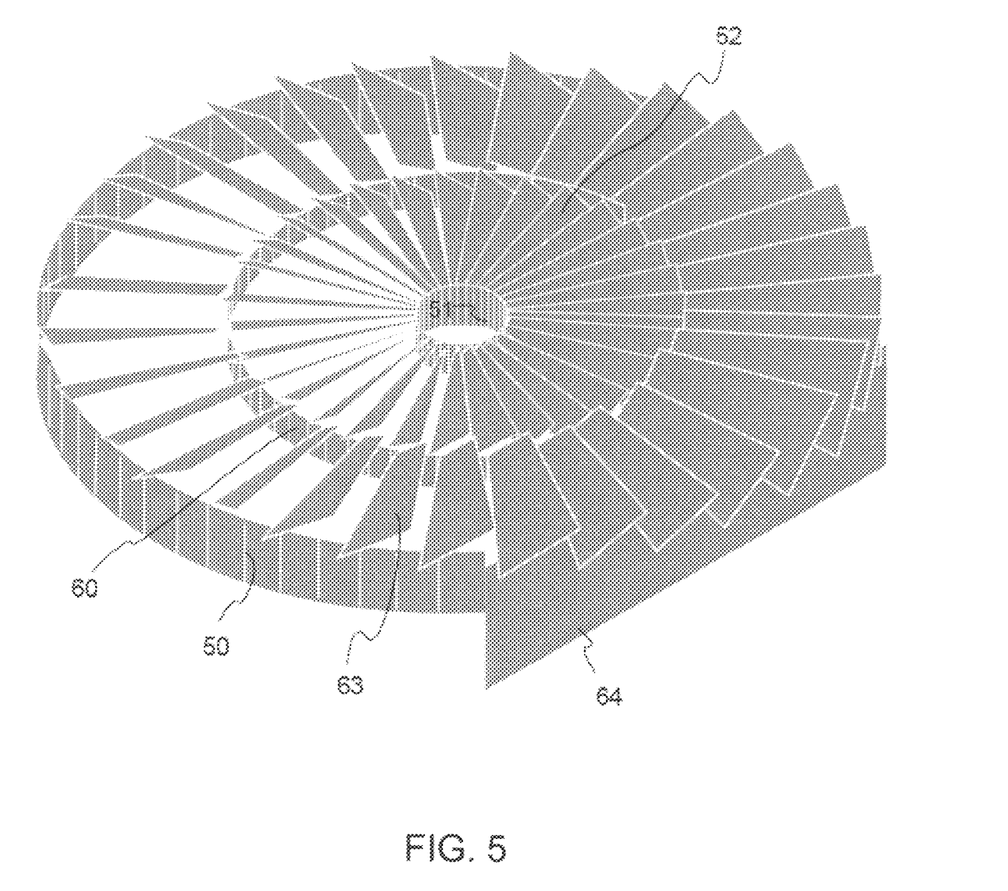
FIG. 5 is an isometric schematic of a radial louver baffle with an intermediate fin support ring in accordance with the present invention.
Figure 6:
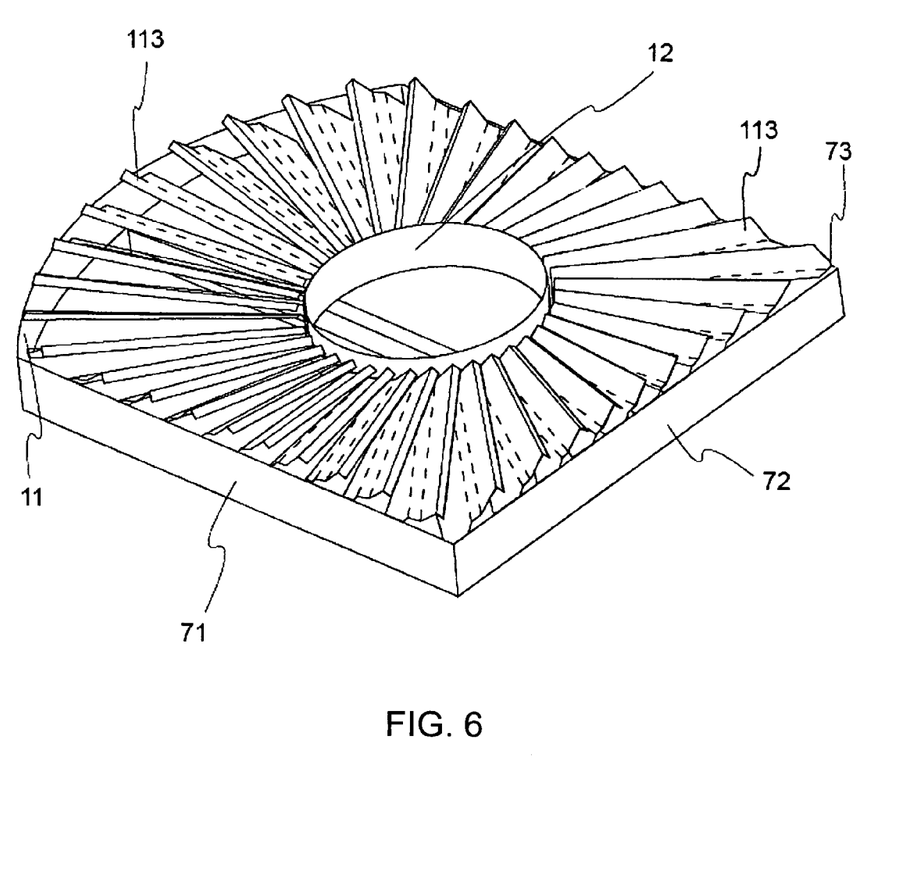
FIG. 6 is an isometric schematic of a radial louver baffle in accordance with another embodiment of the present invention.

The present invention is not intended to be limited to the arrangement disclosed in FIG. 2, other downcomer arrangements as disclosed, for example, in FIGS. 3-6 are considered to be well within the scope of the present invention. FIG. 3, for example, shows a radial louver baffle similar to that of FIG. 2 (reference numerals for similar elements omitted for clarity) with a single chordal downcomer 40 located at one point around the periphery of collar 11. In this case, a flat plate 41 extends chordally form one point on the circumference of collar 11 to another point, below the level of the fins 13 to define the downcomer between plate 41 and the inner curved surface of the column such that liquid can pass there through. The chordal arrangement may be duplicated on radially opposite sides of the baffle as shown in FIG. 4 (similar element references again omitted) where flat plates 42, 43, extend across the circumferential path of collar 11 to form two chordal downcomers, 44, 45 between the plates and the inner curved surface of the column. The formation of multiple downcomers is considered to be well within the scope of the present invention. The flat plates may be disposed at an angle with respect to an adjacent flat plate. The plates may be parallel, as shown in FIG. 4. The plates may be orthogonal with respect to each other, as shown in FIG. 6 with plates 71, 72, 73 extending chordally across the peripheral collar in a similar manner to plates 42, 43 in FIG. 4. Other angles of orientation are contemplated and considered to be well within the scope of the present invention.

The fins 13, 113 in the radial louver baffle may be directed at an angle anywhere between 0° and 180° relative to the plane of the baffle, that is, they may lie in the plane of the baffle (in which case the baffle becomes a radially-slotted baffle as described above) or they may be directed to provide upward vapor flow passages either facing into or away from the direction of rotation of the two-phase vapor/liquid system in the flash zone. The preferred configuration is for the fins to impart a rotation to the vapors ascending from the stripper zone in the same direction as the rotation in the flash zone. In this case, the fins are angularly disposed so that the feed "skims" over the top of the fins in the course of its rotational movement in the flash zone. While the fins may be facing into the direction of rotation of the two-phase vapor/liquid system, it is not preferable because the rotating flow could enter the chamber below the baffle and disturb the liquid surface causing further entrainment.

In general terms, the angular disposition of the fins can be described by reference to a characteristic angle between the plane of each fin and the radial plane passing vertically through the central axis of the baffle (which corresponds to the vertical axis of the tower). This angle will vary between −90° and +90° with a characteristic angle of 0° representing a vertical fin and angles of 90° representing fins parallel to the plane of the baffle, equivalent to the radially slotted baffle. The sense of the angle (− or + values) can be expressed relative to the direction of rotation of the vapor/liquid system in the flash zone The fins define flow passages for the ascending vapors from the stripper and it is preferred that these flow passages direct the ascending vapors in the same rotational sense as the rotation in the flash zone, i.e. in the direction of flow of the two phase system in the flash zone. Reverse inclination of the fins (vapor flow counter to the flash zone rotation) is not generally favored because in such cases, the fins may tend to "peel off" the lower layer of incoming feed and direct it down onto the top stripper tray where it will agitate the liquid and induce re-entrainment. Low characteristic angles, for example, from 0° to 30°, in the desired direction will allow good vapor flow since the axial or near-axial disposition of the fins will allow good upward flow from the region below the baffle, assuming a reasonable spacing between the fins. Normally, the characteristic angle will be from 30° to 60°, e.g. 40 to 50°, relative to the central vertical axis of the baffle, with a value of 45° being most preferred. Within this range, the fins will act to preclude or, at least, impede flow of the feed stream downwards through the baffle to the region of the top stripper tray while, at the same time, providing an adequate area for upward flow of vapors from the stripper below. This preferred angular disposition will also be effective to remove vapors from the region below the baffle by an eductor-type effect as the feed blows over the angled baffles to entrain upcoming vapors but since downward passage of feed vapors is impeded by the fins, re-entrainment of residual liquid from the stripper tray is largely precluded.

The optimum characteristic angle for a baffle in any given service is dependent upon a number of variables such as the physical composition of the feed (vapor/liquid ratio under prevailing tower conditions), feed rate, stripping gas (steam) rate relative to feed rate, tower diameter, location of inlet horns relative to the baffle, location of baffle relative to top stripper tray, with the relationship between these variable being extraordinarily complicated. In most cases, computational fluid dynamics will indicate the appropriate characteristic angle (or range of angles) for a given case but in most cases, it will normally be sufficient to select an angle within the preferred range for adequate results.

The characteristic angle need not be constant along the radial length of the fin and, indeed, there may be an advantage to be gained by imparting a "twist" to the fins, in the manner or an airplane propeller, with the characteristic angle varying from the inner end of the fin to the outer end. The characteristic angle may either increase or decrease along the length of the fins, again depending on the tower design and operational variables. Computational fluid dynamics or experiments may be used to reveal an optimum value of radial variation for the characteristic angle in any given case.

One problem that may be encountered with baffles for columns of relatively large diameter is that the radial fins require support along their length; also, as the radius increases, the distance between each fin increases correspondingly and the open area may increase beyond the amount necessary for vapor flow out of the stripper zone. A form of baffle which addresses both these problems is shown in FIG. 5. This variant of the baffle is similar to the one shown in FIG. 2 (reference numerals for similar elements omitted for clarity) but has an intermediate fin support ring 60 which is located between central collar 51 and outer peripheral collar 50. A number of inner radial fins 52 similar to one another extend between the central hub and intermediate collar 60, fastened to the hub and the collar at each end. It is contemplated that more than one intermediate collar 60 may be provided, which will produce multiple rings of fins. Multiple intermediate collars may be necessary for larger diameter baffles such that the fins have the necessary rigidity. A number of outer fins 63, again similar to one another, extend between intermediate collar 60 and peripheral collar 50, fastened to the two collars at their respective ends. The number of outer fins may differ from the number of inner fins and, if so, the number of outer fins will usually be greater in view of the larger area between the intermediate collar and the peripheral collar. Similarly, the outer fins may be sized or shaped differently to the inner fins since the larger outer area will permit fins with a larger transverse dimension to be accommodated. The liquid downcomer is of the single chordal type, similar to that shown in FIG. 3. A flat plate 64 extends across the circumference of collar 50 to form the downcomer inlet between plate 64 and the inner curved surface of the column.

Computational fluid dynamics has demonstrated the capability of the baffle to reduce axial flow velocities in the feed/flash zone of the tower, typically from values as high as 14 m/s to about 2 m/s, with improved uniformity of the axial flow across the diameter of the tower.

Benefits of the preferred radial louver baffle shared to a greater or lesser extent with the simpler apertured plate baffles, include:

- Fast installation at low cost: the radial louver baffle is relatively small and uncomplicated; it does not require the large amount of welding that is needed with hat-type baffles.
- It is smaller in size therefore reduces the available flash zone volume less, a desirable attribute as reductions in the flash zone volume can have a negative impact on feed droplet capture efficiency.
- The radial louver baffle, being lower in profile than the conical hat, can be installed in towers that have small flash zones; also, removal of one or two stripping trays with its high mechanical costs and reduction in cut point is not necessary.
- The radial louver baffle has a lower re-entrainment potential relative to the conical hat design which has the potential to re-entrain liquid by the shear forces due to 'U-turn' made by the vapor.
- The radial louver baffle has a low pressure drop, a very desirable attribute in a vacuum tower.

It will be apparent to those skilled in the art that various modifications and/or variations may be made without departing from the scope of the present invention. Thus, it is intended that the present invention covers the modifications and variations of the method herein, provided they come within the scope of the appended claims and their equivalents.

What is claimed is:

1. A vacuum distillation tower comprising:
   a feed zone,
   a feed director located in the feed zone for introducing an incoming feed into the feed zone in a rotating flow pattern,
   a flash zone below the feed zone and above the stripping zone,
   a lower stripping zone located below the flash zone,
   a rectification zone above the flash zone, and
   a non-rotating, radially-louvered liquid de-entrainment baffle located above the top of the stripping zone and below the feed zone and with a central axis corresponding to the vertical axis of the tower, comprising a plurality of radial fins with openings between the fins to permit the upward passage of vapors from the portion of the tower below the baffle located below the flash zone and above the stripping zone each fin being angularly inclined with respect to a plane passing through the longitudinal axis of the tower in such a manner that the upper edge of each fin is displaced relative to the lower edge in the direction of rotational movement of the rotating vector of the incoming feed to impart a rotation to the vapors ascending from the stripper zone in the same rotational sense as the rotation in the flash zone.

2. The distillation tower according to claim 1, wherein each fin is angularly inclined with respect to a plane passing through the longitudinal axis of the tower at an angle between 30° to 60°.

3. The distillation tower according to claim 1, wherein the inclination of each fin relative to the central axis of the baffle is constant along the radial length of the fin.

4. The distillation tower according to claim 1, further comprising at least one liquid downcomer to permit downward passage of liquid past the baffle.

5. The distillation tower according to claim 4, wherein the at least one liquid downcomer is located in a central portion of the baffle.

6. The distillation tower according to claim 4, wherein the at least one liquid downcomer is offset from the center of the baffle.

7. The distillation tower according to claim 4, wherein the at least one liquid downcomer comprises two spaced apart liquid passageways.

8. The distillation tower according to claim 4, wherein the at least one liquid downcomer comprises at least two downcomers, wherein one downcomer is disposed at an angle with respect to another dowcomer.

9. The distillation tower according to claim 1, wherein the baffle further comprises:
   a central circular hub;
   a peripheral collar spaced from the central circular hub, wherein the plurality of radial fins extend between the central hub and the peripheral collar.

10. The distillation tower according to claim 9, wherein the central hub comprises an open collar providing a liquid downcomer for passage of liquid downwards through the baffle.

11. The distillation tower according to claim 9, wherein the central hub comprises an upstanding circular wall member and a cover over the top of the wall member.

12. The distillation tower according to claim 9, further comprising: at least one intermediate collar spaced between the central circular hub and the peripheral collar.

13. The distillation tower according to claim 12, wherein a first set of fins extends between the central circular hub and one intermediate collar and a second set of fins extends between the intermediate collar and the peripheral collar.

14. The distillation tower according to claim 9, further comprising at least one liquid downcomer to permit downward passage of liquid past the baffle.

15. The distillation tower according to claim 14, wherein the at least one liquid downcomer is formed from a plate extending chordally from one location on the peripheral collar to another location on the peripheral collar.

16. The distillation tower according to claim 15, which includes two liquid downcomers each formed from a plate extending chordally from one location on the peripheral collar to another location on the peripheral collar.

17. The distillation tower according to claim 16, wherein the two plates extend parallel to each other.

18. The distillation tower according to claim 16, wherein one plate extends at an angle with respect to another plate.

19. A distillation tower according to claim 1, wherein each fin is angularly inclined with respect to the plane passing through the longitudinal axis of the tower in such a manner that the upper edge of each fin is displaced relative to the lower edge in the direction of rotational movement of the incoming feed by an angle from 40° to 50°.

20. A vacuum distillation tower for fractionating petroleum atmospheric resids comprising:
- a stripping zone having stripping trays,
- a flash zone located above the stripping zone,
- a feed zone located above the flash zone,
- a feed director located in the feed zone for introducing an incoming feed into the feed zone in a rotating flow pattern,
- a rectification zone above the feed zone,
- a non-rotating, radially-louvered liquid de-entrainment baffle located above the top of the stripping zone and below the feed zone and with a central axis corresponding to the vertical axis of the tower, comprising a central circular hub, a peripheral collar and a plurality of radial fins extending between the central hub and the peripheral collar, with openings between the fins to permit the upward passage of vapors from the stripping zone of the tower, each fin being angularly inclined with respect to a plane passing through the longitudinal axis of the tower in such a manner that the upper edge of each fin is displaced relative to the lower edge in the direction of rotational movement of the rotating vector of the incoming feed by an angle from 30° to 60° to impart a rotation to the vapors ascending from the stripper zone in the same rotational sense as the rotation in the flash zone.

21. A vacuum distillation tower according to claim 20 in which the upper edge of each fin is displaced relative to the lower edge in the direction of rotational movement of the rotating vector of the incoming feed by an angle from 40° to 50°.

\* \* \* \* \*